(Model.)
L. C. CUMMINS.
FISHING FLOAT.
No. 457,510. Patented Aug. 11, 1891.
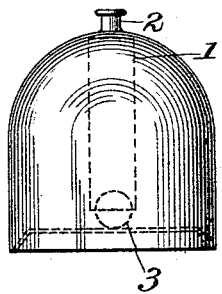
Witnesses
Howell N. Peck
Albert O. Cummins
Inventor.
Lawson C. Cummins

UNITED STATES PATENT OFFICE.

LAWSON CUTLER CUMMINS, OF EAST MONTPELIER, VERMONT.

FISHING-FLOAT.

SPECIFICATION forming part of Letters Patent No. 457,510, dated August 11, 1891.

Application filed August 28, 1890. Serial No. 363,383. (Model.)

*To all whom it may concern:*

Be it known that I, LAWSON CUTLER CUMMINS, a citizen of the United States, residing at East Montpelier, in the county of Washington and State of Vermont, have invented a new and useful Machine, to which I give the name of "Bell-Bobbin," and of which the following is a specification.

My invention relates to improvements in floats for fishing, and the objects of my improvements are, first, to provide a float that shall indicate the biting of the fish by producing a sound-signal, and, second, to provide that the same action that produces the sound shall produce and maintain a sight-signal. I attain these objects by the mechanism illustrated in the accompanying drawings, in which the float is represented in its normal position.

It consists of a hollow air-tight metallic vessel of hemispheroidal form, the plane of which is countersunk sufficiently to render the specific gravity of the entire float about one-half that of the same bulk of water. This plane acts as a sound-plate to give voice to the instrument.

At the pole of this hemispheroidal vessel is placed a neck 2. Within the vessel, in the center of the same, is placed a tube 1, which is attached to the neck 2 and extends longitudinally nearly but not quite to the plane. Upon the plane and partly within the tube 1 is a ball. (Shown at 3.) The float is designed to be attached to a fish-line by looping the line around the neck at 2, and at the distance from the hook it is desired the same shall be from the surface of the water. When thus attached to the line and cast upon the water, it floats with its neck 2 uppermost and is in its normal position.

The fish in attacking the bait draws the neck 2 downward. This downward motion of the neck causes a corresponding upward motion of the plane carrying the ball, which is held in its relative position by the edge of the tube with it. Before the plane has reached an elevation of ninety degrees the center of gravity of the ball 3 falls within the tube 1, and the ball 3 rolls through the tube 1 and strikes the neck 2, producing a sound-signal of a bite at the hook from a fish. The specific gravity of the plane end of the float being reduced by this movement of the ball 3, the plane remains uppermost and a sight-signal is thus produced and maintained.

What I claim as my invention, and desire to secure by Letters Patent, is—

A fishing-float consisting of a hollow vessel of hemispheroidal form having a countersunk resonant diaphragm rigidly secured across the mouth of the same to render it air-tight, a tube secured within the vessel and at its apex and extending nearly to the diaphragm, a loose ball or clapper located in the tube and free to impinge against the diaphragm, and an exterior knob or projection at the apex to which the line is secured.

LAWSON CUTLER CUMMINS.

Witnesses:
    THOMAS J. DEAVITT,
    W. ARTHUR JONES.